US008771625B2

(12) United States Patent
Andreas et al.

(10) Patent No.: US 8,771,625 B2
(45) Date of Patent: Jul. 8, 2014

(54) METHOD FOR REDUCING NITRIC OXIDE IN THE EXHAUST GAS FLOW OF INTERNAL COMBUSTION ENGINES

(75) Inventors: Doering Andreas, Munich (DE); Dieter Rothe, Nuremberg (DE)

(73) Assignee: MAN Truck & Bus AG, Munich (DE)

( * ) Notice: Subject to any disclaimer, the term of this patent is extended or adjusted under 35 U.S.C. 154(b) by 219 days.

(21) Appl. No.: 12/738,385

(22) PCT Filed: Sep. 3, 2009

(86) PCT No.: PCT/EP2009/006402
§ 371 (c)(1),
(2), (4) Date: Sep. 28, 2010

(87) PCT Pub. No.: WO2010/028775
PCT Pub. Date: Mar. 18, 2010

(65) Prior Publication Data
US 2011/0030345 A1    Feb. 10, 2011

(30) Foreign Application Priority Data

Sep. 9, 2008   (DE) .................. 10 2008 046 381

(51) Int. Cl.
| F01N 3/00 | (2006.01) |
| C10L 1/22 | (2006.01) |
| B01D 53/56 | (2006.01) |
| C10L 1/10 | (2006.01) |
| C10L 10/02 | (2006.01) |
| F01N 3/20 | (2006.01) |
| C10L 1/12 | (2006.01) |
| C10L 1/232 | (2006.01) |
| C10L 1/228 | (2006.01) |
| C10L 1/226 | (2006.01) |
| C10L 1/222 | (2006.01) |
| C10L 1/188 | (2006.01) |
| C10L 1/224 | (2006.01) |
| C10L 1/223 | (2006.01) |

(52) U.S. Cl.
CPC ............. *F01N 3/2073* (2013.01); *C10L 1/1266* (2013.01); *C10L 1/232* (2013.01); *C10L 1/10* (2013.01); *Y02C 20/10* (2013.01); *C10L 1/2283* (2013.01); *C10L 1/22* (2013.01); *C10L 10/02* (2013.01); *C10L 1/226* (2013.01); *F01N 2430/04* (2013.01); *C10L 1/2286* (2013.01); *C10L 1/2222* (2013.01); *C10L 1/1883* (2013.01); *C10L 1/224* (2013.01); *C10L 1/223* (2013.01)
USPC ................. 423/235; 44/422; 60/274

(58) Field of Classification Search
None
See application file for complete search history.

(56) References Cited

U.S. PATENT DOCUMENTS

| 2,904,416 | A | * | 9/1959 | Clarke, Jr. et al. ............... 44/379 |
| 4,585,461 | A | * | 4/1986 | Gorman ........................ 44/324 |
| 5,234,477 | A | * | 8/1993 | Gwyn ............................ 44/387 |
| 5,535,708 | A |   | 7/1996 | Valentine |
| 5,578,556 | A | * | 11/1996 | Farng et al. .................. 508/231 |
| 5,584,265 | A | * | 12/1996 | Rao et al. ..................... 123/1 A |
| 6,051,040 | A |   | 4/2000 | Peter-Hoblyn |
| 6,202,407 | B1 |  | 3/2001 | Brusasco et al. |
| 7,210,288 | B2 | * | 5/2007 | Bandl-Konrad et al. ....... 60/297 |
| 7,987,663 | B2 | * | 8/2011 | Hancu et al. ................... 60/286 |
| 2004/0088970 | A1 | * | 5/2004 | Mulligan ....................... 60/286 |
| 2005/0049316 | A1 | * | 3/2005 | Burrington et al. ............ 516/27 |
| 2005/0126157 | A1 | * | 6/2005 | Schwab et al. ................. 60/274 |
| 2008/0041050 | A1 | * | 2/2008 | Doring ........................ 60/605.1 |
| 2008/0202107 | A1 | * | 8/2008 | Boorse et al. .................. 60/301 |
| 2008/0282605 | A1 | * | 11/2008 | Kremer et al. ................ 44/307 |
| 2009/0120068 | A1 | * | 5/2009 | Sakimoto et al. .............. 60/285 |

FOREIGN PATENT DOCUMENTS

| DE | 4423003 A1 | 1/1995 |
| DE | 10022763 A1 | 11/2001 |
| DE | 10226975 A1 | 1/2004 |
| DE | 1004029521 A1 | 1/2006 |

OTHER PUBLICATIONS

German Official Action of Mar. 20, 2009.
International Search Report from corresponding European patent application PCT/EP2009/006402 filed Sep. 3, 2009.

* cited by examiner

*Primary Examiner* — Melvin C Mayes
*Assistant Examiner* — Sheng H Davis
(74) *Attorney, Agent, or Firm* — Wolf, Greenfield & Sacks, P.C.

(57) ABSTRACT

A method is described for reducing nitrogen oxides in the exhaust gas flow of combustion engines, especially a motor vehicle internal combustion engine, wherein an air/fuel mixture in the combustion chamber of the combustion engine is combusted in the presence of a fuel additive and, in the process, the fuel additive decomposes and the exhaust gas flow is guided through at least one catalyst arranged downstream of the combustion chamber. This method is characterized in that a fuel additive is used, which decomposes in the combustion chamber releasing ammonia and the exhaust gas flow containing ammonia is guided through at least one SCR catalyst arranged downstream of the combustion chamber to reduce the concentration of the nitrogen oxides contained therein. The method according to the invention is highly effective in reducing the nitrogen oxide content in the exhaust gas flow of a combustion engine without an exhaust gas aftertreatment system having to be expensively formed and the installation space having to be increased.

15 Claims, No Drawings

METHOD FOR REDUCING NITRIC OXIDE IN THE EXHAUST GAS FLOW OF INTERNAL COMBUSTION ENGINES

RELATED APPLICATIONS

This application is a U.S. National Stage application based on International Application No. PCT/EP2009/006402, filed Sep. 3, 2009, which claims priority German Patent Application No. 10 2008 046 381.7, filed Sep. 9, 2008, the contents of which are incorporated herein by reference in their entirety.

The invention relates to a method for reducing nitrogen oxides in the exhaust gas flow of combustion engines, especially a vehicle combustion engine, wherein an air/fuel mixture is combusted in the combustion chamber of the combustion engine in the presence of a fuel additive and, in the process, the fuel additive decomposes and the exhaust gas flow is guided through at least one catalyst arranged downstream of the combustion chamber.

Most combustion engines are nowadays equipped with aftertreatment systems for reducing polluting emissions because of the exhaust gas limit values which are becoming increasingly strict and which can no longer be achieved purely by measures relating to the engine. Apart from solid particles, nitrogen oxides belong to the limited exhaust gas components which arise during the combustion processes and the permitted emissions of which are continuously being reduced. Different methods are currently being used to minimise these exhaust gas components in combustion engines operated in motor vehicles. The nitrogen oxides are generally reduced with the aid of catalysts, a reducing agent additionally being required in oxygen-rich exhaust gas in order to raise the selectivity and the NOx conversions. These methods have become known under the collective term "SCR methods", with "SCR" standing for "Selective Catalytic Reduction". They have been used for many years in the power station sector and recently also in combustion engines. A detailed description of methods of this type can be inferred from DE 34 28 232 A1. $V_2O_5$-containing mixed oxides, for example in the form of the mixed oxide $V_2O_5/WO_3/TiO_2$ can be used as SCR catalysts. The typical $V_2O_5$ fractions are between 0.2 and 3% by weight. Ammonia or compounds cleaving ammonia, such as urea or ammonium formiate, solid or dissolved, can be used as the reducing agent. In this case, the nitrogen oxides can be reacted with ammonia in the presence of oxygen according to equation (1) to form nitrogen:

$$4NO+4NH_3+O_2 \rightarrow 4N_2+6H_2O \quad (1)$$

the decomposition of urea $((NH_2)_2CO)$ in ammonia $(NH_3)$ is known that this take place in two stages under optimal conditions (temperatures above 350° C.). According to equation (2)

$$(NH_2)_2CO \rightarrow NH_3+HNCO \quad (2)$$

thermolysis takes place first, i.e. the thermal decomposition of urea into ammonia and isocyanic acid. Then hydrolysis takes place according to equation (3)

$$HNCO+H_2O \rightarrow NH_3+CO_2 \quad (3)$$

where isocyanic acid catalytic decomposites (HNCO) in ammonia $(NH_3)$ and carbon dioxide $(CO_2)$. An aqueous urea-water solution is mostly used, primarily in the use of the SCR method in vehicles, because it is easier to handle. As the reducing agent is present in a form dissolved in water, the water has to evaporate before or during the actual thermolysis and hydrolysis, before the above-described reactions can occur. If the temperatures in the reactions according to equations (2) and (3) are below 350° C. or heating only takes place slowly, mainly solid and meltable cyanuric acid is produced according to DE 40 38 054 A1 by trimerisation of the isocyanic acid formed according to (2) in accordance with equation (4).

$$3HNCO \underset{>350° C.}{\overset{<350° C.}{\rightleftarrows}} (HNCO)_3 \quad (4)$$

The cyanuric acid formed easily leads to the clogging of the SCR catalyst arranged thereafter. It is therefore proposed in DE 40 38 054 as a remedy that the exhaust gas flow loaded with the reducing agent is guided via a hydrolysis catalyst. The exhaust gas temperature from which a quantitative hydrolysis becomes possible can thus be reduced to 160° C.

The structure and composition of a corresponding catalyst is described in DE 40 38 054 as well as the structure and function of an SCR catalyst equipped with a hydrolysis catalyst. It is necessary when using urea or an aqueous urea solution to feed this as an additional operating substance by and via a suitable feed and delivery device to the exhaust gas. In addition, a hydrolysis catalyst has to be arranged in the exhaust gas section. This leads to a rise in the construction volume necessary for the exhaust gas aftertreatment, which is often connected with problems in the restricted base conditions in motor vehicles. The freezing point of a 32.5% urea solution of −11.5° C. is a further problem as the tank, lines and the metering system have to be heated at low temperatures. In addition, considerable costs arise for the metering system necessary for this.

In combustions engines operated in motor vehicles, the reduction of the nitrogen oxide with the aid of the SCR method is difficult because changing operating conditions are present there, which makes the metering of the reducing agent more difficult in terms of quantity. On the one hand, as high a conversion of nitrogen oxides as possible is to be achieved but, on the other hand, care has to be taken so that the emission of unused ammonia does not occur. In order to eliminate this problem, an ammonia blocking catalyst is frequently arranged downstream of the SCR catalyst, which converts excess ammonia into nitrogen and water vapour. Furthermore, the use of $V_2O_5$ as the active material for the SCR catalyst can cause problems if the exhaust gas temperature at the SCR catalyst exceeds 650° C. because $V_2O_5$ then sublimates. $V_2O_5$-free iron or copper zeolites are therefore used for high temperature applications.

The problems of the prior art described above are not eliminated by the method known from DE 44 23 003 C2 for reducing the nitrogen oxide concentration in the exhaust gas flow of a vehicle internal combustion engine. The air/fuel mixture is accordingly combusted in the presence of a selectively reducing additive in the combustion chamber of a combustion engine. The selectively reducing additive decomposes in the process in order to react with nitrogen oxides in the combustion chamber and to reduce them. This method is known from the power plant sector by the name SNCR (Selective Non-Catalytic Reduction) and only operates at temperatures above 700° C. Ammonia, hydrazine and tricyanuric acid (cyanuric acid) are preferred as an additive in DE 44 23 003 C2, with the first two mentioned only being able to be used hypothetically because of their toxicity or easy flammability. The reaction of the reducing agent with the nitrogen oxides to be reduced, as already mentioned, should take place in the combustion chamber. The reactions to be postulated are, however, too slow and not so selective by a long way as in the SCR method, so a large number of undesired by-products are formed. This is also described in DE 44 23 003 C2, in which the use of cyanuric acid is particularly problematical in this context as it leads to the formation of $N_2O$ (see column 7, lines 35-37). Urea, which also tends to form $N_2O$ via the intermediate product HNCO, has proven to be just as problematical in this context. The non-catalytic reaction of the reducing agent with the nitrogen oxides to be reduced will not take place or not to an adequate extent in the exhaust gas section because of the low exhaust gas temperatures in combustion engines operated with excess air, of a maximum of 600° C. Furthermore, the solubility of the reducing agent cyanuric acid at 12 or 18 percent in dimethyl sulphoxide (DMSO) or dimethyl amide (DMA) is too low for adequate effectiveness. In addition, the use of the solvent DMSO is disadvantageous as it leads to a formation of undesired sulphur compounds in the exhaust gas section.

The invention was therefore based on the object of developing the methods described at the outset in such a way that the drawbacks described of known methods are substantially ruled out. In this case, it should be possible, especially for exhaust gas aftertreatment systems for $NO_x$ reduction in oxygen-rich exhaust gas or parts of an exhaust gas aftertreatment system in the exhaust gas section to be able to be arranged in such a way that an increase in the installation space can be avoided.

The above object is achieved by a method of the type described at the outset in that a fuel additive is used which decomposes in the combustion chamber releasing ammonia, and the exhaust gas flow containing ammonia is guided through at least one SCR catalyst arranged downstream of the combustion chamber to reduce the concentration of the nitrogen oxides contained therein.

Advantageous configurations of this method emerge from the sub-claims 2 to 14 still to be described below.

The basic idea of the present invention is to use fuel and/or fuel additives, by means of which at the end of combustion ammonia is released in the combustion chamber and this ammonia is used on downstream SCR catalysts to reduce nitrogen oxides. On the one hand, the expensive addition of reducing agent in the exhaust gas section can thus be dispensed with and, on the other hand, a high selectivity with respect to nitrogen is ensured by the reduction in the nitrogen oxides at SCR catalysts, so the quantity of $N_2O$ formed is kept low or the formation thereof is completely prevented. This succeeds owing to the use of nitrogen-containing organic compounds, which contain no phosphorus or sulphur and which release ammonia during their decomposition.

When using the fuel or fuel additive which cleaves ammonia, care has to be taken that the ammonia is not oxidised during the combustion in order to be able to achieve sufficient $NO_x$ conversions at the downstream SCR catalyst.

Compounds should therefore be selected which prevent oxidation of the ammonia. This succeeds, on the one hand, by the use of large organic molecules, in which the nitrogen is protected from direct oxidation and/or by the encapsulation of nitrogen-containing compounds. The aim here is the release of ammonia only at the end of the combustion.

Care has to be taken when selecting the compounds that, unlike when using cyanuric acid or urea, only small quantities of laughing gas, advantageously below 30 ppm, are formed. If this does not succeed purely by the selection of a suitable compound, the quantity of this compound fed has to be reduced.

Thus, nitrogen-containing, heterocyclic organic compounds, consisting of one or more rings, which contain no sulphur or phosphorus, are recommended, especially heterocycloalkanes and/or heterocycloalkenes and/or heteroaromatics with one or more nitrogen atoms.

It is a matter of a preferred organic nitrogen compound. Of these compounds, guanidine, azirine, aziridine, diaziridine, pyrrole, pyrazole, triazole, imidazole, pyridine, pyrimidine, pyrazine, pyrazidine, triazine, purine, azepine, chinoline, isochinoline, indole, benzimidazole, phenazine, porphine, pteridine and/or isoindole are particularly preferred.

Ammonia precursors with amino and/or ammonium compounds can be used particularly advantageously. Particularly recommended functionalisated compounds with amino groups are amino-aziridine, -diaziridine, -pyrrole, -imidazole, -pyridine, -pyrimidine, -pyrazine, -pyrazidine, -triazine, -purine, -azepine, -chinoline, -isochinoline, -indole, -benzimidazole and/or -isoindole. An ammonium organyl is preferably used here.

When using ammonium organyls of the general form $(NR_4^+X^-)$, wherein $R^+$ consists of hydrogen and/or at least one $C_1$-$C_{30}$ alkyl and $X^-$ is composed of formiate and/or acetate and/or alkylate and/or oxalate and/or carbonate Inter alia. Butyl-$NH_4$, methyl-$NH_4$, phenyl-$NH_4$, ethyl-$NH_4$, t-butyl-$NH_4$, phenyl-$CH_2$—$NH_4$ and/or $NH_4$—$C_5H_5$ are possible. These compounds can also be functionalised with amino groups. In order to protect the ammonia from oxidation, the use of organically complexed ammonia compounds is sensible as the ammonium is advantageously surrounded by the organic complex here. Possibilities for this are, especially, tetraammoniummethylenediaminetetraacetate, triammoniumnitriloacetate, tetraammoniumcyclohexanediamine-(1,2)-acetate, pentaammoniumdiethylenetriaminepentaacetate, tetraammoniumethyleneglycol-bis(aminoethylether)-N,N'-tetraacetate, N-(2-hydroxyethyl)-ethylenediamine-N,N,N'-triaceticacidtriammoniumsalt and/or hexaammoniumtriethylenetetraaminehexaacetate.

The fuel additive can be added directly to the fuel tank and/or be mixed by means of a separate tank into the fuel outside the fuel tank. It is preferred for a solution of the fuel additive in dimethylacetamide, dimethylformamide and/or dimethylpyridine to be used.

The exhaust gas aftertreatment system is preferably characterized in that the SCR catalysts contain vanadium, vanadium pentoxide, titanium dioxide, tungsten oxide, copper-containing zeolites, iron-containing zeolites and/or cobalt-containing zeolites as the active component to reduce nitrogen oxides with the aid of ammonia.

As the quantity of the ammonia formed is strongly linked to the quantity of the combusted fuel or fuel additive, the quantity of the ammonia formed may exceed the quantity of the $NO_x$ formed during the combustion. This would lead to substantial $NH_3$ emissions downstream of the SCR catalyst. It is therefore sensible to arrange, downstream of the SCR catalyst, a catalyst for the oxidation of $NH_3$. Platinum and/or palladium and/or iridium and/or the oxides and/or zeolites thereof are possibilities as the active component.

An optimal solution of the underlying objective is achieved by the invention, especially by the advantageous developments described. It has been shown that the nitrogen oxide content in the exhaust gas flow of combustion engines can be highly effectively reduced and to a desirable extent by the fuel additive used according to the invention, without an exhaust gas aftertreatment system having to be expensively formed and the installation space having to be increased.

The invention claimed is:
1. A method for reducing nitrogen oxides in an exhaust gas flow of a combustion engine, comprising:

combusting an air/fuel mixture in a combustion chamber of the combustion engine in the presence of an effective quantity of a fuel additive and wherein, in the process, the fuel additive decomposes in the combustion chamber releasing ammonia; and guiding the exhaust gas flow through at least one SCR catalyst arranged downstream of the combustion chamber such that the concentration of the nitrogen oxides contained therein is reduced, wherein the fuel additive contains one or more of tetraammoniummethylenediaminetetraacetate, triammoniumnitriloacetate, tetraammoniumcyclohexanediamine-(1,2)-acetate, pentaammoniumdiethylenetriaminepentaacetate, tetraammoniumethylene glycol-bis(aminoethylether)-N,N'-tetraacetate, N-(2-hydroxyethyl)-ethylenediamine-N,N,N'-triaceticacid-triammonium salt, and/or hexaammoniumtriethylenetetraaminehexaacetate.

2. A method according to claim 1, wherein the fuel additive further comprises at least one additional organic nitrogen-containing compound.

3. A method according to claim 2, wherein the additional organic nitrogen-containing compound comprises at least one of a) a nitrogen-containing, heterocyclic compound which has one or more rings and no sulphur or phosphorus content, and b) an ammonia precursor with amino and/or ammonium groups.

4. A method according to claim 3, wherein compound a) comprises one or more of guanidine, azirine, aziridine, diaziridine, pyrrole, imidazole, pyrazole, triazole, pyridine, pyrimidine, pyrazine, pyrazidine, triazine, purine, azepine, chinoline, isochinoline, indole, benzimidazole, phenazine, porphine, pteridine and isoindole.

5. A method according to claim 3, wherein compound b) comprises an ammonium organyl of the form $NR_4^+X^-$.

6. A method according to claim 5, wherein said $R^+$ comprises at least one of hydrogen and at least one $C_1$-$C_{30}$ alkyl.

7. A method according to claim 5 or claim 6, wherein said X comprises at least one of formiate and acetate and alkylate and oxalate and carbonate.

8. A method according to claim 7, wherein the ammonium organyl compounds are selected from the group butyl-$NH_4$, methyl-$NH_4$, phenyl-$NH_4$, ethyl$NH_4$, t-butyl-$NH_4$, phenyl-$CH_2$—$NH_4$, $NH_4$—$C_5H_5$ butyl-$NR_4$, methyl-$NR_4$, phenyl$NR_4$, ethyl-$NR_4$, t-butyl-$NR_4$, phenyl-$CH_2$—$NR_4$ and $NR_4$—$C_5H_5$ (wherein R=$C_1$-$C_{30}$ alkyl-).

9. A method according to any of claims 1-6, wherein the at least one SCR catalyst comprises at least one of vanadium, vanadium pentoxide, titanium dioxide, tungsten oxide, copper-containing zeolites, iron-containing zeolites and cobalt-containing zeolites.

10. A method according to claim 9, wherein the active component of the catalyst comprises at least one of platinum, palladium, and iridium, in the form of their oxides, and/or zeolites.

11. A method according to any of claims 1-6, wherein if the quantity of the ammonia formed exceeds the quantity of the NO formed during combustion, providing a catalyst for the oxidation of ammonia arranged downstream of the SCR catalyst to reduce undesired ammonia emissions.

12. A method according to any of claims 1-6, wherein the fuel additive comprises a solution containing at least one of dimethylacetamide, dimethylformamide and dimethylpyridine.

13. A method according to any of claims 1-6, wherein the effective quantity of the fuel additive is added directly to the fuel and/or fed to the fuel by a tank from the fuel itself.

14. A method according to any of claims 1-6, wherein the exhaust gas flow leaving the combustion chamber and/or SCR catalyst has a laughing gas (dinitrogen oxide) concentration of less than 30 ppm.

15. A method according to claim 5 or claim 6, wherein the ammonium organyl compounds are selected from the group butyl-$NH_4$, methyl-$NH_4$, phenyl-$NH_4$, ethyl$NH_4$, t-butyl-$NH_4$, phenyl-$CH_2$—$NH_4$, $NH_4$—$C_5H_5$ butyl-$NR_4$, methyl-$NR_4$, phenyl$NR_4$, ethyl-$NR_4$, t-butyl-$NR_4$, phenyl-$CH_2$—$NR_4$ and $NR_4$—$C_5H_5$ (wherein R=$C_1$-$C_{30}$ alkyl-).

* * * * *